(12) United States Patent
Takemoto et al.

(10) Patent No.: US 7,796,785 B2
(45) Date of Patent: Sep. 14, 2010

(54) IMAGE EXTRACTING APPARATUS, IMAGE EXTRACTING METHOD, AND IMAGE EXTRACTING PROGRAM

(75) Inventors: Fumito Takemoto, Kanagawa (JP); Kenji Kojima, Tokyo (JP)

(73) Assignee: FujiFilm Corporation, Tokyo (JP)

( * ) Notice: Subject to any disclaimer, the term of this patent is extended or adjusted under 35 U.S.C. 154(b) by 1169 days.

(21) Appl. No.: 11/365,945

(22) Filed: Mar. 2, 2006

(65) Prior Publication Data

US 2006/0210165 A1    Sep. 21, 2006

(30) Foreign Application Priority Data

Mar. 3, 2005  (JP)  ............... 2005-059428

(51) Int. Cl.
*G06K 9/00* (2006.01)
(52) U.S. Cl. ............... 382/118; 382/190; 382/209; 382/305
(58) Field of Classification Search ............... 382/118, 382/190, 209, 278, 296, 305
See application file for complete search history.

(56) References Cited

U.S. PATENT DOCUMENTS

| | | | | |
|---|---|---|---|---|
| 6,879,709 B2* | 4/2005 | Tian et al. | ............ | 382/118 |
| 7,027,054 B1* | 4/2006 | Cheiky et al. | ............ | 345/473 |
| 7,187,786 B2* | 3/2007 | Kee | ............ | 382/118 |
| 7,274,822 B2* | 9/2007 | Zhang et al. | ............ | 382/224 |
| 7,369,687 B2* | 5/2008 | Kawato et al. | ............ | 382/118 |
| 7,372,981 B2* | 5/2008 | Lai et al. | ............ | 382/118 |
| 7,379,568 B2* | 5/2008 | Movellan et al. | ............ | 382/118 |
| 7,715,659 B2* | 5/2010 | Zhao et al. | ............ | 382/305 |
| 2003/0128389 A1* | 7/2003 | Matraszek et al. | ............ | 358/1.18 |
| 2003/0133599 A1* | 7/2003 | Tian et al. | ............ | 382/118 |
| 2003/0232871 A1* | 12/2003 | Sheikh et al. | ............ | 514/406 |
| 2004/0165754 A1* | 8/2004 | Tabata | ............ | 382/118 |
| 2005/0117783 A1* | 6/2005 | Sung et al. | ............ | 382/118 |
| 2005/0200722 A1* | 9/2005 | Ono | ............ | 348/222.1 |
| 2006/0078201 A1* | 4/2006 | Kim et al. | ............ | 382/181 |

FOREIGN PATENT DOCUMENTS

JP    2004-046591 A    2/2004

* cited by examiner

*Primary Examiner*—Gregory M Desire
(74) *Attorney, Agent, or Firm*—Birch, Stewart, Kolasch & Birch, LLP

(57) ABSTRACT

The image extracting apparatus according to the present invention includes: a candidate image extracting section for extracting a moving image component including the facial image of a predetermined person from a moving image; and a representative image extracting section for extracting the moving image component including the facial image of the predetermined person which is more different from the facial image of the predetermined person with the usual facial expression among the plurality of moving image components extracted by the candidate image extracting section.

14 Claims, 12 Drawing Sheets

IMAGE EXTRACTING APPARATUS, IMAGE EXTRACTING METHOD, AND IMAGE EXTRACTING PROGRAM

CROSS REFERENCE TO RELATED APPLICATION

The present application claims priority from Japanese Patent Applications No. JP 2005-059428 filed on Mar. 3, 2005 filed on Mar. 3, 2005, the contents of which are incorporated herein by reference.

BACKGROUND OF THE INVENTION

1. Field of the Invention

The present invention relates to an image extracting apparatus, an image extracting method, and an image extracting program. Particularly, the present invention relates to an image extracting apparatus, an image extracting method, and an image extracting program for extracting a moving image component to be outputted as a still image from a moving image including a plurality of moving image components.

2. Related Art

Conventionally, a method has been suggested, for displaying and printing out frame images in the order of well evaluated facial expression by comparing a predetermined shape of each facial part such as the eyebrow and the mouth with the shape of each part of the face included in the frame images consisting of a moving image to evaluate good/bad of the facial expression in a plurality of persons included in the frame image, for example as disclosed in Japanese Patent Application Publication No. 2004-046591.

However, the above-described conventional art evaluates by comparing a predetermined shape of each facial part with the shape of each part of the face of each person in spite that the face of each person is different from each other. Therefore, it is difficult that the frame image including the facial image of the same person with greatly changed facial expression is appropriately extracted.

SUMMARY OF THE INVENTION

Thus, it is an object of the present invention to provide an image extracting apparatus, an image extracting method and an image extracting program which are capable of solving the problem accompanying the conventional art. The above and other objects can be achieved by combining the features recited in independent claims. Then, dependent claims define further effective specific example of the present invention.

A first aspect of the present invention provides an image extracting apparatus for extracting a candidate image to be outputted as a representative image from a plurality of candidate images. The image extracting apparatus includes: a candidate image extracting section for extracting at least one candidate images including the facial image of a predetermined person from a plurality of candidate images; and a first representative image extracting section for extracting the candidate image including the facial image of the predetermined person which is more different from the facial image of the predetermined person with the usual facial expression among at least one of candidate images extracted by the candidate image extracting section as a first representative image. Additionally, the image extracting apparatus further includes an average facial information storage section for storing average facial information indicative of the facial image of the predetermined person with the usual facial expression in association with the predetermined person and a facial image comparison section for comparing the facial image included in the candidate image extracted by the candidate image extracting section with the facial image indicated by the average facial information stored in the average facial information storage section. The first representative image extracting section may extract the candidate image including the facial image of the predetermined person which is more different from the facial image indicated by the average facial information stored in the average facial information storage section among the candidate images extracted by the candidate image extracting section. Further, the image extracting apparatus includes a facial image extracting section for extracting the facial image of the predetermined person from each of the plurality of candidate images extracted by the candidate image extracting section, respectively and an average facial information generating section for generating the average facial information on the predetermined person based on the plurality of facial images extracted by the facial image extracting section. The average facial information storage section may store the average facial information generated by the average facial information generating section in association with the predetermined person.

The candidate image may be a moving image component included in a moving image. The candidate image extracting section may extract the moving image component included in the facial image of the predetermined person from the moving image. The first representative image extracting section may extract the moving image component including the facial image of the predetermined person which is more different from the facial image of the predetermined person with the usual facial expression as the first representative image. Additionally, the image extracting apparatus further includes an average facial information storage section for storing average facial information indicative of the facial image of the predetermined person with the usual facial expression and a facial image comparison section for comparing each facial image included in the plurality of moving image components extracted by the candidate image extracting section with the facial image indicated by the average facial information stored in the average facial information storage section. The first representative image extracting section may extract the moving image component including the facial image of the predetermined person which is more different from the facial image indicated by the average facial information stored in the average facial information storage section among the moving image components extracted by the candidate image extracting section.

Further, the image extracting apparatus includes a facial image extracting section for extracting the facial image of the predetermined person from each of the plurality of moving image components extracted by the candidate image extracting section, respectively and an average facial information generating section for generating the average facial information on the predetermined person based on the plurality of facial images extracted by the facial image extracting section. The average facial information storage section may store the average facial information generated by the average facial information generating section in association with the predetermined person. The image extracting apparatus further includes a part image extracting section for extracting a plurality of part images from each of the plurality of facial images extracted by the facial image extracting section and an average part shape calculating section for calculating the average shape for each part based on the plurality of part images extracted by the part image extracting section. The average facial information generating section may generate the average facial information on the predetermined person based on the average shape for each part calculated by the average part shape calculating section. The image extracting apparatus further includes a facial expression change calculating section for calculating the change of the facial image of the predetermined person in the plurality of moving image components extracted by the candidate image extracting section. The first representative image extracting section may extract a moving image component when the facial image of the predetermined person starts changing or a moving image component when the facial image of the predetermined person stops changing as the first representative image.

The image extracting apparatus further includes a template storage section for storing a template to previously define the image position and personal facial expression information indicative of the facial expression of the person included in the representative image to be laid out at the image position. The first representative image extracting section may extract the candidate image in which the facial expression of the person indicated by the personal facial expression information associated with the image position included in the template stored in the template storage section and the facial expression of the person included in the candidate image extracted by the candidate image extracting section are corresponded as the first representative image. Then, the template storage section may store the template for the output area to previously define the image position and facial expression displacement information indicative of the amount of displacement of the facial expression of the person included in the first representative image to be laid out at the image position. The first representative image extracting section may extract the candidate image in which the amount of displacement of the facial expression of the person indicated by the facial expression displacement information associated with the image position included in the template stored in the template storage section and the amount of displacement of the facial expression of the person included in the candidate image extracted by the candidate image extracting section as the first candidate image.

Additionally, the template storage section stores the template for the output area to previously define the image position and variety of facial expression information indicative of the variety of facial expression of the person included in the first image to be laid out at the image position. The first representative image storage section may extract the candidate image in which the variety of facial expression of the person indicated by the variety of facial expression information associated with the image position included in the template stored in the template storage section and the variety of facial expression of the person included in the candidate image extracted by the candidate image extracting section are corresponded as the first representative image. Further, the image extracting apparatus may include a template storage section for storing the template for the output area to previously define a first representative image position at which a first representative image should be laid out and a second representative image position at which a second representative image should be laid out, a facial expression information determining section for determining personal facial expression information included in the second representative image to be laid out at the second representative image position according to the personal facial expression information indicative of the facial expression of the person included in the first representative image extracted by the first representative image extracting section and a second representative image extracting section for extracting the second representative image including the person with the facial expression indicated by the personal facial expression information determined by the facial expression information determining section from the candidate images extracted by the candidate image extracting section.

A second aspect of the present invention provides an image extracting method for extracting a candidate image to be outputted as a representative image from a plurality of candidate images. The image extracting method includes the steps of: extracting at least one candidate images including the facial image of a predetermined person from a plurality of candidate images; and extracting the candidate image including the facial image of the predetermined person which is more different from the facial image of the predetermined person with the usual facial expression among at least one of candidate images extracted in the candidate image extracting step as a first representative image.

A third aspect of the present invention provides an image extracting program for an image extracting apparatus extracting a candidate image to be outputted as a representative image from a plurality of candidate images. The image extracting program operates the image extracting apparatus to function as: a candidate image extracting section for extracting at least one candidate images including the facial image of a predetermined person from a plurality of candidate images; and a representative image extracting section for extracting the candidate image including the facial image of the predetermined person which is more different from the facial image of the predetermined person with the usual facial expression among at least one of candidate images extracted by the candidate image extracting section as a representative image.

Here, all necessary features of the present invention are not listed in the summary of the invention. The sub-combinations of the features may become the invention.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
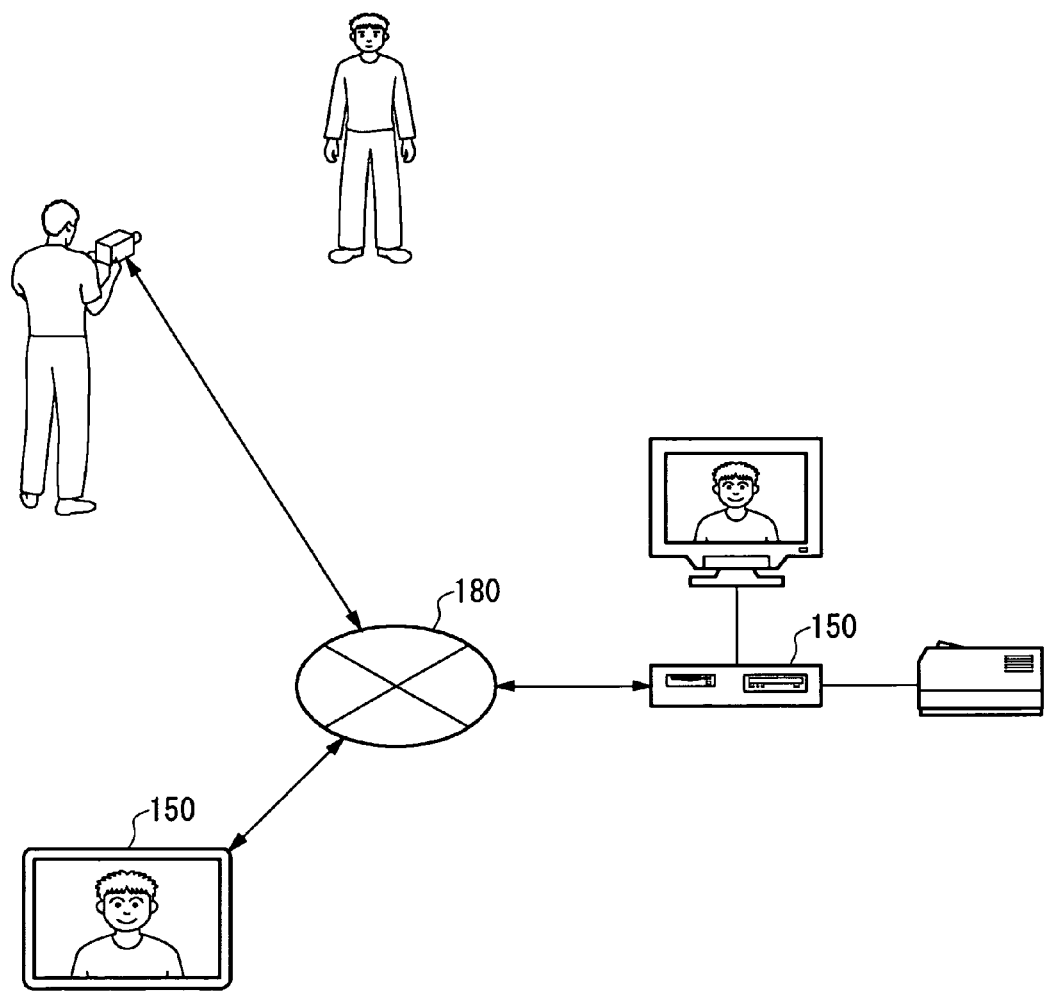
FIG. 1 is a conceptual diagram of an image extracting apparatus 150.

FIG. 1 is a conceptual diagram of an image extracting apparatus 150 according to an example of the present invention. The image extracting apparatus 150 extracts a candidate image to be outputted as a representative image from a plurality of candidate images. Here, the representative image is a candidate image to be material for an album, such as an image appeared on the cover of the album, an image mainly laid out at the center of the page of the album and an image used for the background over one page of the album. Additionally, the representative image may be an image mainly displayed at the center of a display device such as a photostand and an image emphatically displayed on the display device. For example, a representative image of the person is the image obtained by capturing the various facial expression of a predetermined person, such as a smile, an angry face and a tearful face. The candidate image may be a moving image component included in a still image or a moving image. Then, a moving image component included in the moving image may be any type of image consisting of the moving image, such as a flame image, a field image and so forth.

For example, after a user captures a moving image, the captured moving image is provided to the image extracting apparatus 150 through a network 180. Here, the network 180 is Internet and LAN, for example. Additionally, the captured moving image may be provided to the image extracting apparatus 150 using a recording medium using a magnetic recording media such as memory and a semiconductor recording medium. The image extracting apparatus 150 may receive the moving image not only through the memory and the Internet but also through radio communication and optical communication.

The image extracting apparatus 150 extracts the moving image component including the predetermined persons such as a user, and friends and family of the user. Here, the predetermine person can be freely determined by the user. Then, the image extracting apparatus 150 compares the facial image of the predetermined person included in the extracted moving image component with the facial image of the predetermined person with the usual facial expression to extract the moving image component of the predetermined person including the facial image more different from the facial image with the usual facial expression as the representative image. Here, the usual expression may be a facial expression of the predetermined person included in a prepared image. Additionally, the usual facial expression may be a face on which emotion and affectivity are not appeared, that is a face without expression.

After the image extracting apparatus 150 extracts a plurality of representative images, the representative images are laid out into image layout frames of the images included in the template of the album to create the album. The representative images may be the main image in the album, and images other than the representative images may be sub-images to create the album. The representative images may display for a time longer than the time for displaying the other moving image components on a display device such as a photostand. Further, when a plurality of moving image components including the representative images are displayed on one screen, the representative image may be mainly displayed at the center on the display device and emphatically displayed with blinking.

The image extracting apparatus 150 according to the present embodiment aims to automatically extract a candidate images including an image on which the expressive face of a predetermined person is shown as the representative image.

Figure 2:
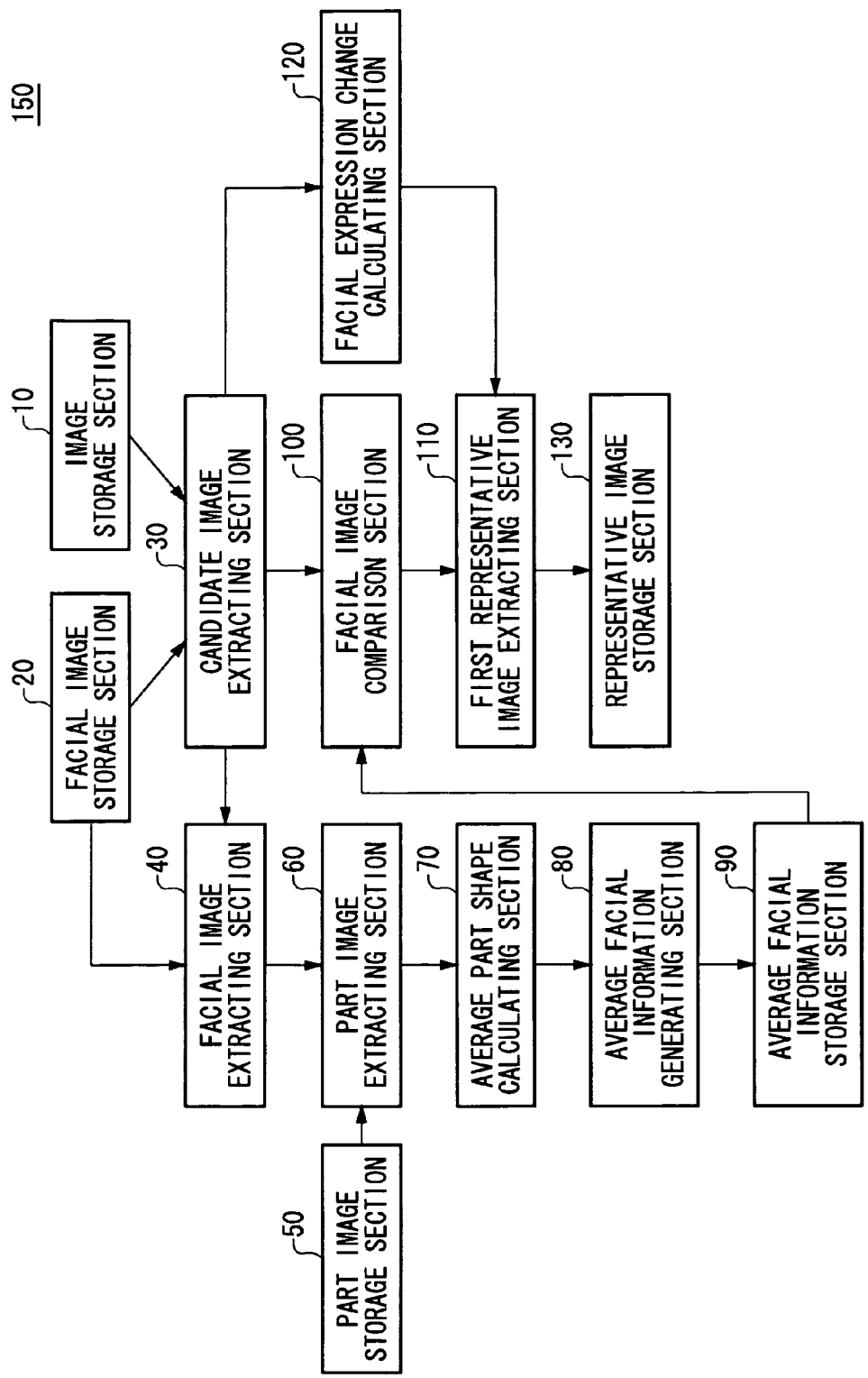
FIG. 2 is a block diagram showing the functional configuration of the image extracting apparatus 150.

FIG. 2 is a block diagram showing the functional configuration of the image extracting apparatus 150 according to the present embodiment. The image extracting apparatus 150 includes an image storage section 10, a facial image storage section 20, a candidate image extracting section 30, a facial image extracting section 40, a part image storage section 50, a part image extracting section 60, an average part shape calculating section 70, an average facial information generating section 80, an average facial information storage section 90, a facial image comparison section 100, a first representative image extracting section 110, a facial expression change calculating section 120 and a representative image storage section 130.

The image storage section 10 stores a captured moving image. The facial image storage section 20 stores the facial images of persons and the facial image information thereof in association with each person. Here, the facial image information is information indicative of the position in the face and the distance between each of the parts such as the eye, the nose and the mouth of the person, for example. The facial image storage section 20 provides the facial image and the facial image information to the candidate image extracting section 30 and the facial image extracting section 40.

The candidate image extracting section 30 matches the facial image of the predetermined person received from the facial image storage section 20 with the facial image of the person included in the moving image component of the moving image received from the image storage section 10 to extract the moving image component including the predetermined person. The candidate image extracting section 30 provides the extracted moving image component to the facial image extracting section 40, the facial image comparison section 100 and the facial expression change calculating section 120. The facial image extracting section 40 extracts the facial image of the predetermined person from each of the plurality of moving image components extracted by the candidate image extracting section 30, respectively.

For example, the facial image extracting section 40 extracts the facial region of a person by means of flesh-color extracting. Then, the facial image extracting section 40 matches the facial image of the predetermined person received from the facial image storage section 20 with the facial image included in the extracted moving image component to extract the facial image of the predetermined person, respectively. The facial image extracting section 40 provides the extracted facial image of the predetermined person to the part image extracting section 60.

The part image storage section 50 stores each part characteristic of the facial image of the person in association with each of the facial parts of the person. Here, each part may be the eye, the nose, the mouth, the ear, the eyebrow and the profile of the face. The part image storage section 50 may store part information such as the position of each part in the face and the distance between each of the parts. The part image storage section 50 provides the part image to the part image extracting section 60.

The part image extracting section 60 extracts a plurality of part images from each of the plurality of facial images extracted by the facial image extracting section 40, respectively. For examples, the part image extracting section 60 matches the part image of such as the eye and the nose received from the part image storage section 50 with each part in the plurality of extracted facial images to extract the plurality of part images, respectively. The part image extracting section 60 provides the extracted part image to the average part shape calculating section 70.

The average part shape calculating section 70 calculates the average shape for each part of the predetermined person based on the plurality of part images extracted by the part image extracting section 60. Additionally, the average part shape calculating section 70 provides the calculated average shape of each part to the average facial information generating section 80. The average facial information generating section 80 generates average facial information on the predetermined person based on the plurality of facial images extracted by the facial image extracting section 40. The average facial information generating section 80 may generate the average facial information on the predetermined person based on the average shape for each part calculated by the average part shape calculating section 70.

The average facial information storage section 90 stores the average facial information indicative of the usual facial expression of the predetermined person in association with the predetermined person. The average facial information may be information indicative of the prepared facial image of the predetermined person, the facial image with the usual facial expression and the position of each part included in the predetermined person with the usual facial expression. Additionally, the average facial information storage section 90 may store the average facial information generated by the average facial information generating section 80 in association with the predetermined person. The average facial information storage section 90 provides the average facial information to the facial image comparison section 100.

The facial image comparison section 100 compares the facial image of the person included in the candidate image extracted by the candidate image extracting section 30 with the facial image indicated by the average facial information stored in the average facial information storage section 90. Specifically, when the candidate image is a moving image component, the facial image comparison section 100 compares each of the facial images included in the plurality of moving image components extracted by the candidate image extracting section 30 with the facial image indicated by the average facial information received from the average facial information storage section 90. For example, the facial image comparison section 100 compares each of the facial images included in the moving image component with the facial image indicated by the average facial information by matching. Additionally, the facial image comparison section 100 may detect the position of each part such as the eye and the eyebrow from the facial image of the predetermined person included in the moving image component and compare the same with the position of each part of the average facial information. Then, the facial image comparison section 100 provides the comparison result to the first representative image extracting section 110.

The first representative image extracting section 110 extracts the representative image of the predetermined person from the plurality of moving image components extracted by the candidate image extracting section 30 based on the comparison result received from the facial image comparison result 100. The first representative image extracting section 110 extracts the moving image component including the prepared facial image of the predetermined person, or the moving image component including the facial image of the predetermined person with the facial expression more different from the usual facial expression as the representative image. For example, the first representative image extracting section 110 matches the facial image with the usual facial expression with the facial image included in the moving image component, and when the facial images are not matched, the first representative image extracting section 110 determines that the facial image included in the moving image component is different.

Then, the first representative image extracting section 110 extracts the moving image component including the facial image being most different among the facial images which are determined as being different. For example, the first representative image extracting section 110 extracts the moving image component including the facial image of which amount of displacement calculated based on the usual facial expression of each part included in the face is larger than a predetermined reference value. Here, the reference value for the amount of displacement can be freely set by the user. Additionally, the first representative image extracting section 110 may compare the image including the prepared facial image of the predetermined person with the plurality of moving image components extracted by the candidate image extracting section 30 to extract the moving image component including the facial image of which amount of displacement of the facial expression is larger than the predetermined reference value.

Additionally, the first representative image extracting section 110 may extract the representative image based on the comparison result by the facial image comparison section 100. For example, when the facial image of the predetermined person included in the moving image component is not matched with the facial image indicated by the average facial information on the predetermined person based on the result by the facial image comparison section 100, and when the matching degree is less than the predetermined reference value, the first representative image extracting section 110 may determine that the above-described moving image component is greatly different and extract the moving image component as the representative image. Here, the predetermined reference value can be freely set by the user.

Additionally, the fist representative image extraction section 110 may extract a moving image component when the facial image of the predetermined person starts changing or a moving image component when the facial image of the predetermined person stops changing as the representative image based on the change in the facial image of the predetermined person calculated by the facial expression change calculating section 120. Then, the representative image storage section 130 stores the representative image extracted by the first representative image extracting section 110 in association with the predetermined person included in the moving image component.

The image extracting apparatus 150 according to the present embodiment can compare the facial image indicated by the average facial information of a predetermined person with the facial image of the predetermined person included in the moving image component to extract the representative image including the facial image of the predetermined person more different from the facial image indicated by the average facial information. Therefore, the moving image component on which the expressive face is shown can be automatically extracted.

Figure 3:
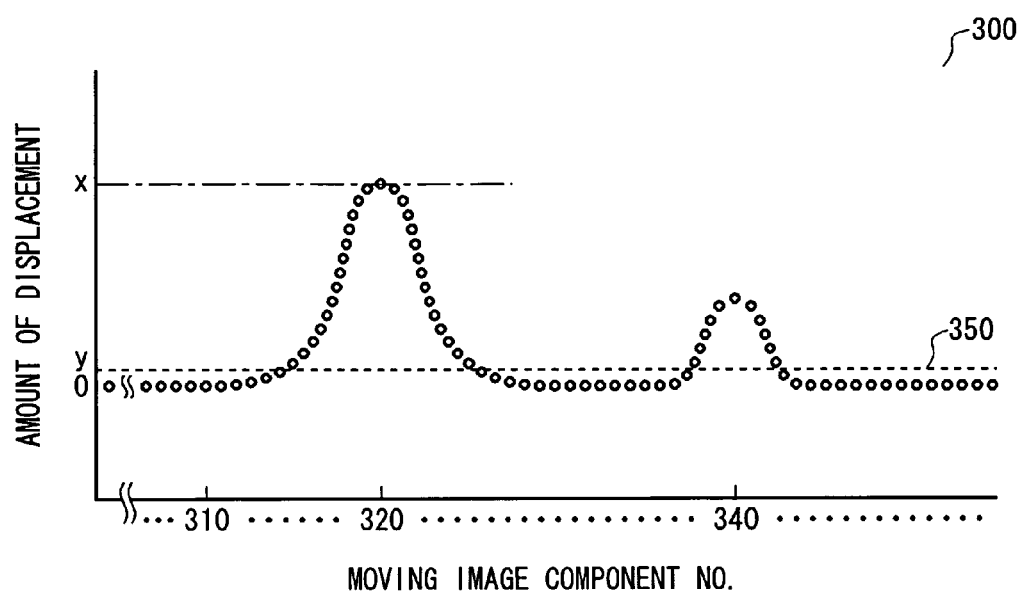
FIG. 3 shows a method of calculating an average position of the characteristic point set to parts of the face.
Figure 4:
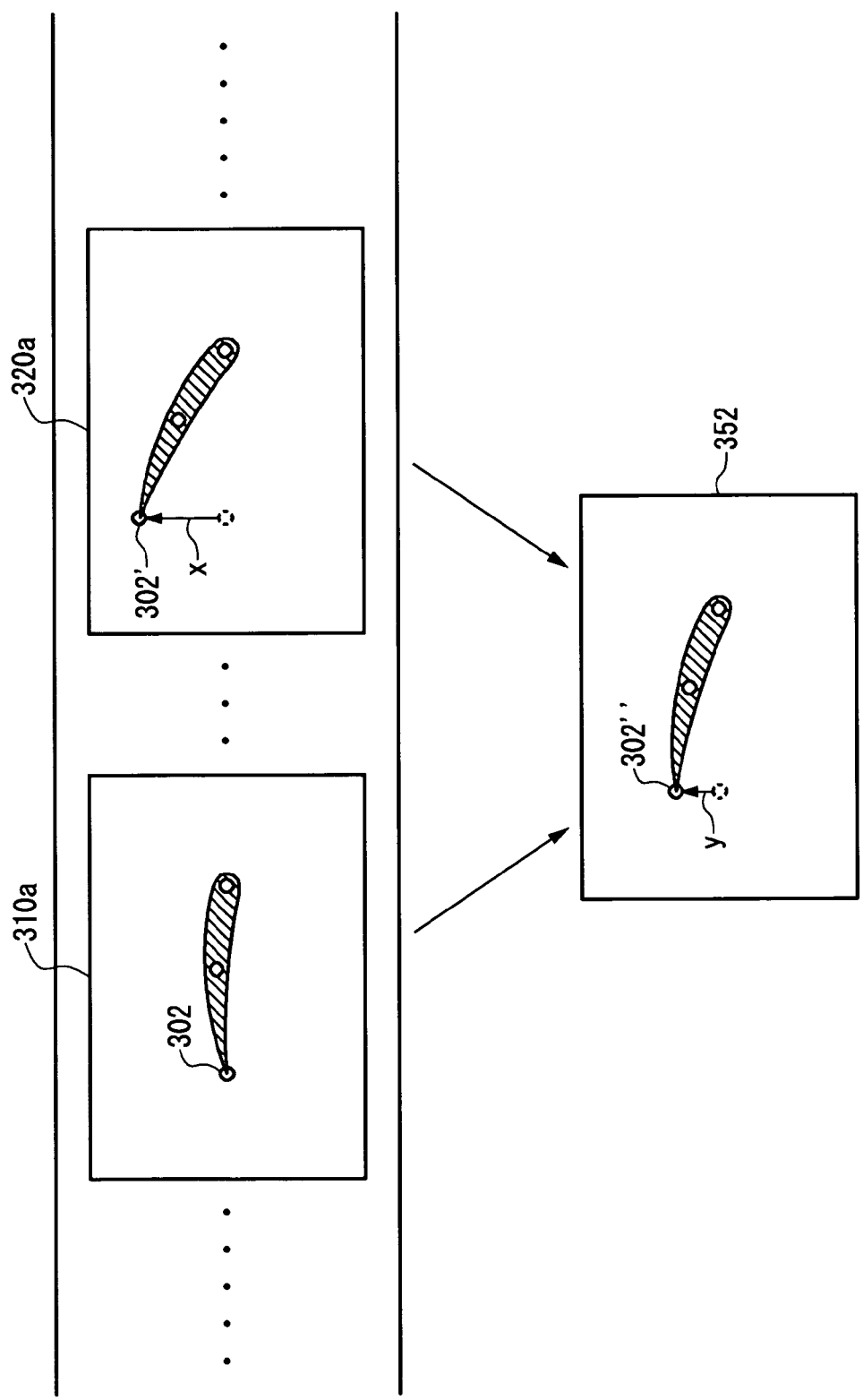
FIG. 4 shows a method of calculating the average shape of a part of the face.

FIG. 3 shows an example of the method of calculating an average position of the characteristic point set to a part of the face. FIG. 4 shows an example of the method of calculating the average shape of a part of the face. The average part shape calculating section 70 and the average facial information generating section 80 set the predetermined characteristic point to each part such as the eye, the nose, the mouth and the eyebrow and generate the average shape and the average facial information for each part based on the amount of displacement of the position of the characteristic point.

As shown in a moving image component 310*a* of FIG. 4, the plurality of characteristic points are set on the end and the center of the eyebrow in a usual facial expression. Then, when the position of the eyebrow is changed due to changing the facial expression of the person, the average part shape calculating section 70 calculates the amount of displacement of each characteristic point based on each characteristic point in the usual facial expression. For example, the average part shape calculating section 70 calculates an amount of displacement x from the position of a characteristic point 302*a* of the eyebrow of the moving image component 310 in the usual facial expression to the position of a characteristic point 302' of a moving image component 320*a* in a changed facial expression.

The average part shape calculating section 70 calculates an average value y of the amount of displacement represented by a doted line 350 of a graph 300 in FIG. 3 based on the amount of displacement of the characteristic point 302 in each of the moving image components. Therefore, the average position of the characteristic point 302 of the eyebrow is calculated as a characteristic point 302" in the part shape of an average image 352 in FIG. 4. Then, the average part shape calculating section 70 calculates the average value of the amount of displacement at each characteristic point of the eyebrow. Therefore, the average shape of eyebrow as shown in the part shape of the average image 352 in FIG. 4.

Here, one characteristic point of the eyebrow has been described with reference FIG. 3 and FIG. 4. However, in order to calculate the average shape of eyebrow, a plurality of characteristic points may be used. Additionally, a plurality of characteristic points are set to each part not only the eyebrow but also the eye, the nose and the mouth in the face so that the average shape for each part can be calculated. Further, it has been described that the reference point is the characteristic point for each part in the usual facial expression with reference to FIG. 3 and FIG. 4, however, the setting of the reference point is not limited to that. For example, the characteristic point for each part may be the reference point in the expressive face such as a smile.

Figure 5:
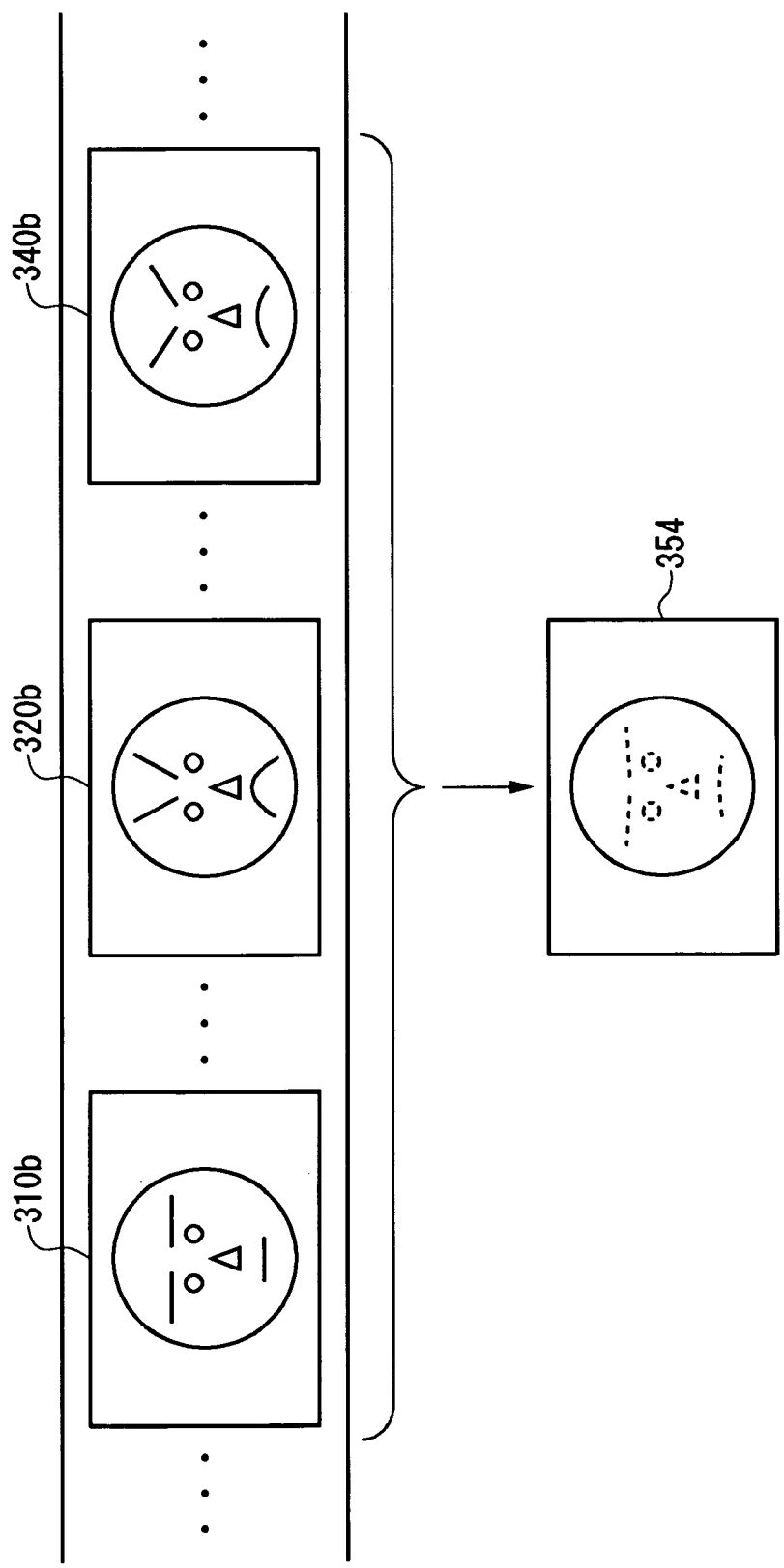
FIG. 5 shows a method of generating the average facial information by an average facial information generating section 80.

FIG. 5 shows an example of the method of generating the average facial information by an average facial information generating section 80. The average facial information generating section 80 generates the average facial information on the predetermined person based on the plurality of facial images extracted by the facial image extraction section 40. For example, the average facial information generating section 80 calculates the average shape for each part included in the face as described with reference to FIG. 3 and FIG. 4. Then, the average facial information generating section 80 combines the average shape for each part to generate the average facial information of a predetermined person.

For example, the average facial information generating section 80 calculates the average facial information on the predetermined person from a plurality of moving image components including a moving image component 310*b*, a moving image component 320*b* and a moving image component 340*b* to generate an average facial image 354 of the predetermined person. Here, in most moving images, the facial expression of the person is generally usual facial expression, so that the average facial information will be information on the facial image with the facial expression close to the usual facial expression.

The image extracting apparatus 150 according to the present embodiment can generate the average facial information on the predetermined person from the plurality of moving image components extracted from the moving image. Thereby the moving image component including the facial image of the predetermined person more different from the average facial information close to the usual facial expression, so that the facial image with the changed facial expression of the predetermined person can be automatically and exactly extracted.

Figure 6:
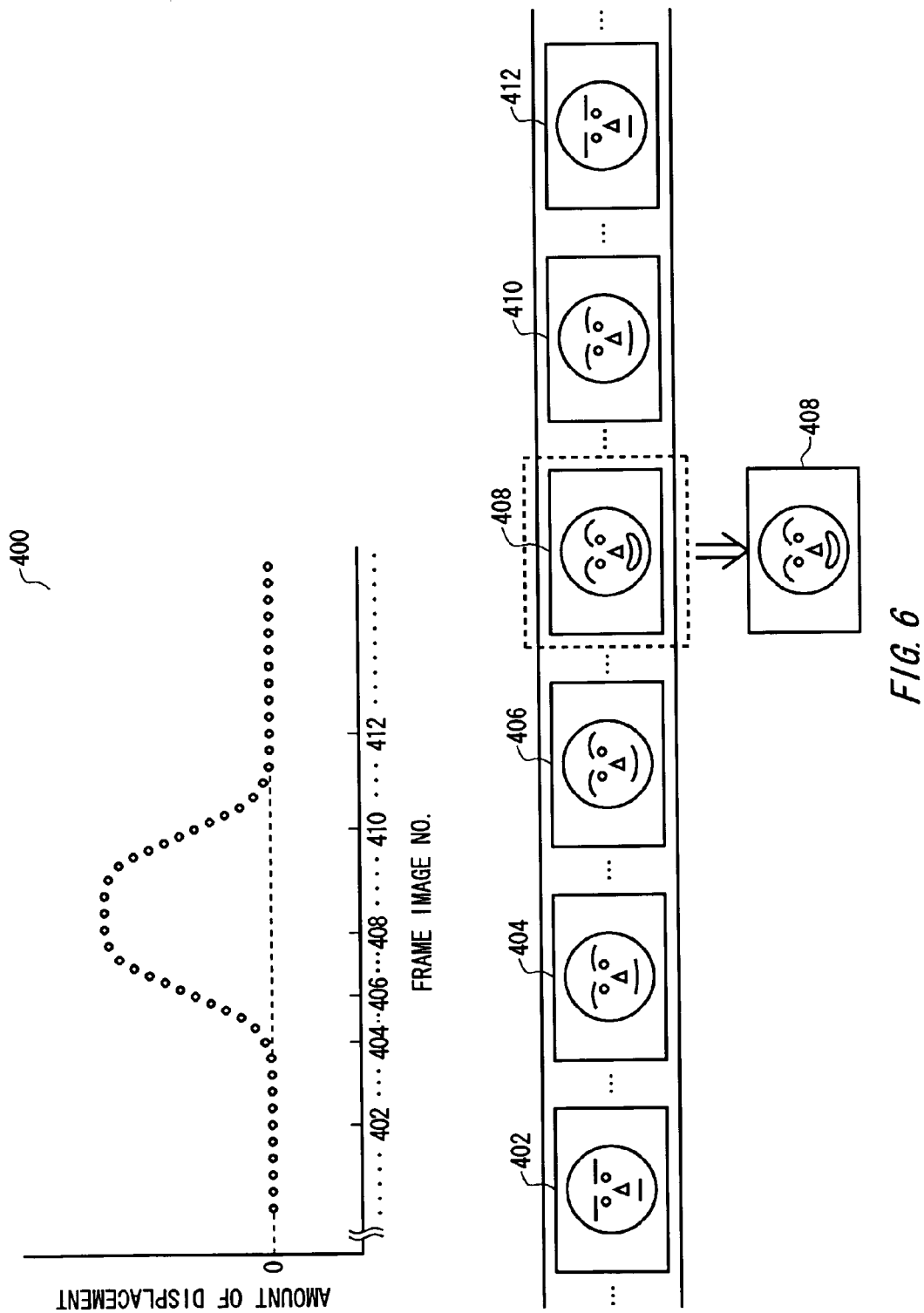
FIG. 6 shows a method of extracting a representative image by a first representative image extracting section 110.

FIG. 6 shows an example of the method of extracting a representative image 408 by a first representative image extracting section 110. The facial expression change calculating section 120 calculates the change in the facial image of the predetermined person from the plurality of moving image components extracted by the candidate image extracting section 30. Then, the first representative image extracting section 110 extracts the representative image based on the change of the facial image of the predetermined person calculated by the facial expression change calculating section 120.

The facial expression change calculating section 120 calculates the amount of displacement of the characteristic point set to such as the eyebrow and the mouth of the predetermined person. For example, the facial expression change calculating section 120 calculates the amount of displacement of the characteristic point of the eyebrow in each of the moving image components (graph 400). The first representative image extracting section 110 determines that the facial image starts changing in the moving image component of which amount of displacement is changed. Then, the first representative image extracting section 110 extracts the moving image component determined that the facial image starts changing therein as the representative image of the person.

Additionally, the first representative image extracting section 110 determines that the facial image stops changing at the end of changing the amount of displacement of the characteristic point of the eyebrow. Then, the first representative image extracting section 110 may extract the moving image component determined that the facial image stops changing therein as a representative image 408 of the person. Here, it may be determined that the facial image starts changing or stops changing based on not only the change of the characteristic point of the eyebrow but also the characteristic point of each part or characteristic points of a plurality of parts.

Figure 7:
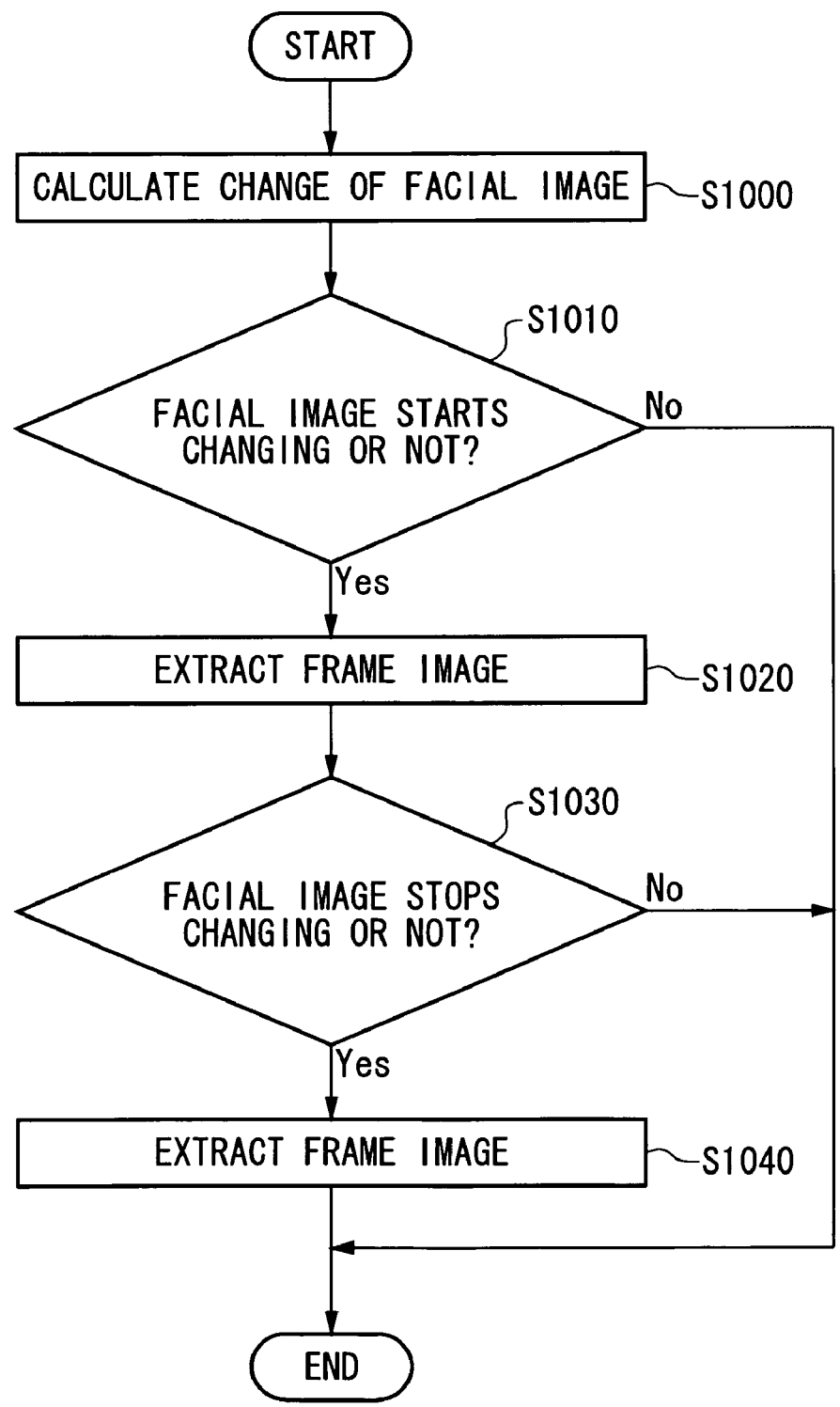
FIG. 7 is a flowchart showing a processing of the image extracting apparatus 150.

FIG. 7 is an example of processing of the image extracting apparatus 150. Firstly, the facial expression change calculating section 120 calculates the change in the facial image of the predetermined person included in the moving image component extracted by the candidate image extracting section 30 (S1000). Next, the first representative image extracting section 110 determines whether the facial image of the predetermined person starts changing based on the change in the facial image of the predetermined person calculated by the facial expression change calculating section 120 (S1010). When the facial image starts changing (S1010: Yes), the first representative image extracting section 110 extracts as the representative image the moving image component when the facial image of the predetermined person stars changing (S1020).

Additionally, the candidate image extracting section 30 determines whether the facial image of the predetermined person stops changing based on the change in the facial image of the predetermined person calculated by the facial expression change calculating section 120 (S1030). When the facial image stops changing (S1030: Yes), the first representative image extracting section 110 may further extract as the representative image the moving image component when the facial image of the predetermined person stops changing (S1040).

The image extracting apparatus 150 according to the present embodiment can extract the moving image component when the facial image of the predetermined person starts changing or stops changing as the representative image.

Thereby the moving image component of which facial image is changed can be automatically and exactly extracted, so that the user can easily utilize the moving image component on which the expressive face of the predetermined person is shown.

Figure 8:
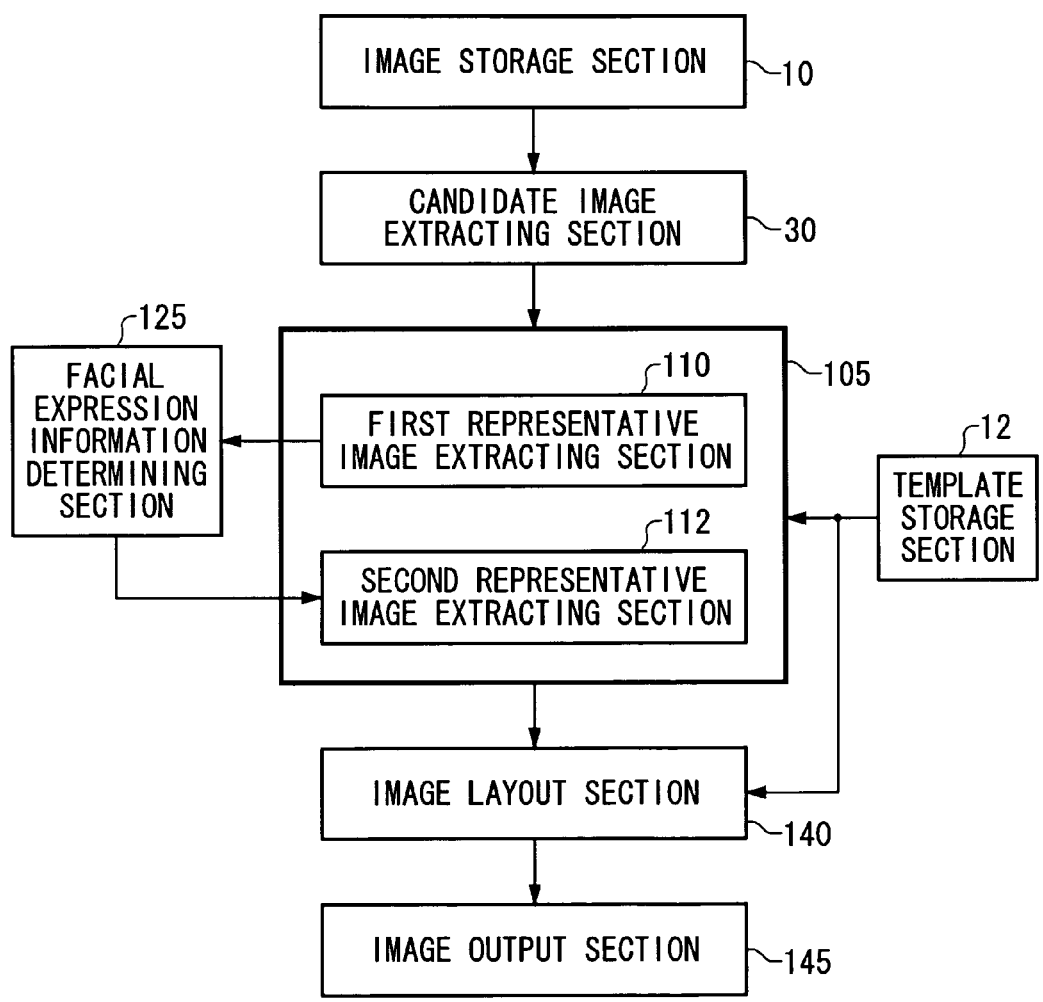
FIG. 8 is a block diagram showing the functional configuration of the image extracting apparatus 150.

FIG. 8 is a block diagram showing an example of the functional configuration of the image extracting apparatus 150 according to another embodiment of the present invention. The image extracting apparatus 150 includes a template storage section 12, a representative image extracting unit 105, a facial expression information determining section 125, an image layout section 140 and an image output section 145. The representative image extracting unit 105 has a first representative image extracting section 110 and a second representative image extracting section 112. Here, the image extracting apparatus 150 according to the present embodiment may further include a part of or all of the configuration and the function of the image extracting apparatus 150 described above with reference to FIG. 1-FIG. 8.

The template storage section 12 stores a template for the output area to previously define the image position at which an image is laid out and composite information to identify the representative image to be laid out at the image position. The template of the album page is an example of the template stored in the template storage section 12. The album page may be the cover, a facing page and one-half of the facing page. Here, the composite information may be facial expression information indicative of the facial expression of the person included in the representative image. The personal facial expression information may be facial expression displacement information indicative of the amount of displacement of the facial expression of the person, and facial variety information indicative of the variety of the facial expression of the person. Additionally, the template storage section 12 stores a template for the output area to previously define a first representative image position at which a first representative image should be laid out and a second representative image position at which a second representative image should be laid out. The template storage section 12 provides the composite information associated with the image position included in the template to the first representative image extracting section 110 based on the control by the first representative image extracting section 110. Additionally, the template storage section 12 provides the template of the album to the image layout section 140 based on the control by the image layout section 140.

Here, the first representative image may be a main image, for example. The main image is an image intended to most strongly impress on the viewer in a page of the album. For example, the main image may be an image including the main character in the album. Additionally, the main image may be the most enhanced image among a plurality of images laid out in the page. Specifically, the main image may be an image of which size is larger than that of the other images, which is laid out in front of the other images and which is more centrally laid out. Additionally, the main image may be an image enhanced by surrounding with the frame, and also may be an image in which a visual effect such as an effect processing is given to the subject. Meanwhile, the second representative image of the present embodiment may be a sub-image. Here, the sub-image may be an image including subjects other than the main character in the album. Additionally, the sub-image may be smaller than the main image and also may be an image laid out in the outside of the center.

The image storage section 10 stores a plurality of candidate images. The candidate images may be any of still images or moving images. Then, when the image storage section stores a moving image, the image storage section 10 may store a plurality of moving image components of the moving image. The image storage section 10 provides the stored candidate images to the candidate image extracting section 30 based on the control by the candidate image extracting section 30. Here, composite information may be associated with each of the candidate images stored in the image storage section 10, respectively. The composite information may be not only the personal facial expression information, the facial expression displacement information and the variety of facial expression information, but also information indicative of the characteristic of the image to be laid out at the image position, such as the object name and the person's name in the image, the casting of the person (e.g. the main character of the album based on the kind of album), information indicative of the position of the main character in the image, the birthday of the person in the image, image capturing information such as the focal distance at capturing the image, the time and date of image-capturing and the image direction component of the image.

The candidate image extracting section 30 extracts at least one of candidate images including the facial image of the predetermined person from the plurality of candidate images. Specifically, when the candidate images are still images, the candidate image extracting section 30 may extract a plurality of candidate images including the same person based on the face and the color of clothes of the person in the still images For example, the candidate image extracting section 30 may extract the face of the person in the still image by an image processing such as a flesh-color extracting and match the plurality of candidate images including the extracted person's face each other to extract the still image including the same person as the candidate image. The candidate image extracting section 30 provides the extracted candidate image to the representative image extracting unit 105. Specifically, the candidate image extracting section 30 provides the extracted candidate image to the first representative image extracting section 101.

The representative image extracting unit 105 extracts the representative image of the predetermined person from the plurality of candidate images received from the candidate image extracting section 30. Specifically, the representative image extracting section 110 included in the representative image extracting unit 105 extracts the candidate image including the facial image of a predetermined person which is more different from the facial image with the usual facial expression of the predetermined person among the plurality of candidate images received from the candidate image extracting section 30 as the first representative image. Additionally, the first representative image extracting section 110 causes the template storage section 12 to provide the template to the first representative image extracting section 110. Then, the first representative image extracting section 110 extracts the first representative image among the plurality of candidate images received from the candidate image extracting section 30 based on the composite information associated with the image position included in the template received from the template storage section 12.

Specifically, the first representative image extracting section 110 extracts a candidate image in which the facial expression of the person indicated by the personal facial expression information associated with the image position included in the template received from the template storage section 12 and the facial expression of the person included in the candidate image extracted by the candidate image extracting section 30 are corresponded as the first representative image. For example, when the personal facial expression information is facial expression displacement information, the first representative image extracting section 110 extracts a candidate image in which the amount of displacement of the facial expression indicated by the facial expression displacement information associated with the image position and the amount of displacement of the facial expression of the person included in the candidate image as the first representative image. Specifically, the facial expression displacement information may be information indicating that the position of a part such as the eyebrow in the face of the predetermined person is displaced from the position of the part in the usual facial expression of the person by more than predetermined value. Alternatively, the facial expression displacement information may be information indicating that the position of a part such as the eyebrow in the face of the predetermined person is displaced from the position of the part in the usual facial expression of the person by less than predetermined value.

For example, the facial image comparison section 100 compares the candidate image with the facial image indicated by the average facial information stored in the average facial information storage section 90 to calculate the displacement of the part in the face of the person included in the candidate image. Then, the facial image comparison section 100 calculates the distance between the position of the predetermined part in the usual facial expression of the predetermined person and the maximum displaced position therefrom. Here, when the position of the part is displaced by more than the predetermined ratio of the distance, information indicating that the facial expression of the person is changed may be associated with the image position and the candidate image as facial expression displacement information. Then, the first representative image extracting section 110 compares the displacement indicated by the facial expression displacement information associated with the image position with the displacement of the part in the face of the person included in the candidate image calculated by the facial image comparison section 100 and extracts the candidate image in which the displacement of the part in the face of the person included in the candidate image and the displacement of the part indicated by the facial expression displacement information are corresponded as the first representative image. Additionally, the first representative image extracting section 110 may extract the candidate image of the person including the predetermined part of which amount of displacement is less than the amount of displacement indicated by the facial expression displacement information as the first representative image.

The image layout position may be associated with variety of facial expression information indicative of the facial expression of the person included in the image to be laid out at an image position. The variety of facial expression information may be information indicative of various facial expression such as a smile, a tearful face, a straight face and an angry face. Information indicative of the facial expression of the person included in the candidate image may be tagged to the candidate image. For example, information indicative of the various facial expression such as a smile, a tearful face, a straight face and an angry face may be tagged to the candidate image as information indicative of the facial expression of the person included in the candidate image. Then, the first representative image extracting section 110 reads the variety of facial expression information associated with the image position included in the template received from the template storage section and extracts the candidate image including the person with the facial expression corresponding to the facial expression indicated by the read variety of facial expression information as the first representative information. The first representative image extracting section 110 provides the extracted first representative image to the image layout section 140. Additionally, the first representative image extracting section 110 provides the personal facial expression information indicative of the facial expression of the person included in the extracted first representative image to the facial expression information determining section 125.

The facial expression information determining section 125 determines the personal facial expression information included in the second representative image to be laid out at the second representative image position according to the personal facial expression information received from the first representative image extracting section 110. For example, when the amount of displacement of the facial expression of the person included in the first representative image is more than the predetermined value, the facial expression information determining section 125 may associate information indicating that the amount of displacement of the facial expression of the person included in the second representative image to be laid out at the second representative image position is also more than the predetermined value with the second representative image position. Additionally, when the amount of displacement of the facial expression of the person included in the first representative image is more than the predetermined value, the facial expression information determining section 125 may associate information indicating that the amount of displacement of the facial expression of the person included in the second representative image to be laid out at the second representative image position is less than the predetermined vale with the second representative image position. Further, the facial expression information determining section 125 may associate information indicative of the variety of the facial expression of the person included in the second representative image to be laid out at the second representative image position with the second representative image position in association with the variety of the facial expression of the person included in the first representative image. For example, when the variety of the facial expression of the person included in the first representative image is a smile, the facial expression information determining section 125 may associate information indicating that the facial expression of the person included in the second representative image is smile with the second representative image position. Alternatively, when the variety of the facial expression of the person included in the first representative image is a tearful face, the facial expression information determining section 125 may associate information indicating that the facial expression of the person included in the second representative image is smile with the second representative image position. The facial expression information determining section 125 provides the determined personal facial expression information to the second representative image extracting section 112.

The second representative image extracting section 112 included in the representative image extracting unit 105 extracts the second representative image including the person with the facial expression indicated by the personal facial expression information received from the facial information determining section 125 among the candidate images extracted by the candidate image extracting section 30. For example, when the personal facial expression information is information indicative of the variety of the facial expression of the person, the second representative image extracting section 112 compares the variety of the facial expression indicated by the personal facial expression information received from the facial expression information determining section 125 with the variety of the facial expression of the person associated with the candidate image and extracts the candidate image including the person with the facial expression corresponding to the variety of the facial expression indicated by the personal facial expression information as the second representative image. Additionally, when the second representative image extracting section 112 receives information indicating that the amount of displacement of the facial expression of the person included in the second representative image is more than the predetermined value, the second representative image extracting section 112 extracts the candidate image including the person with the facial expression of which amount of displacement is more than the predetermined value as the second representative image. Further, when the second representative image extracting section 112 receives information indicating that the amount of displacement of the facial expression of the person included in the second representative image is less than the predetermined value, the second representative image extracting section 112 extracts the candidate image including the person with the facial expression of which amount of displacement is less than the predetermined value as the second representative image. The second representative image extracting section 112 provides the extracted second representative image to the image layout section 140.

The image layout section 140 lays out the received first representative image and the received second representative image into the image position in the template, respectively. Specifically, the image layout section 140 lays out the first representative image into the first image position. Then, the image layout section 140 lays out the second representative image into the second image position. The image layout section 140 provides the template in which the first representative image and the second representative image have been laid out to the image output section 145. The image output section 145 outputs the template received from the image layout section 140. For example, the image output section 145 may be a printing device. The printing device may print the template in which the images are laid out on a medium such as papers to create the album. Additionally, the image output section 145 may record the template in which the images are laid out on a recording medium such as a DVD. Further, the image output section 145 may display the template in which the images are laid out on a display device such as a monitor.

In the image extracting apparatus 150 according to the present embodiment, information indicative of the facial expression of the person to be included in the image laid out into the image layout frame is previously associated with the image layout frame into which the image included in the template of the album is laid out, and the candidate image including the person with the facial expression corresponding to the facial expression of the person indicated by the information can be automatically extracted. Therefore, when images are laid out into the template of the album, the user can save money and the labor to select the desired image among a number of images.

Figure 9:
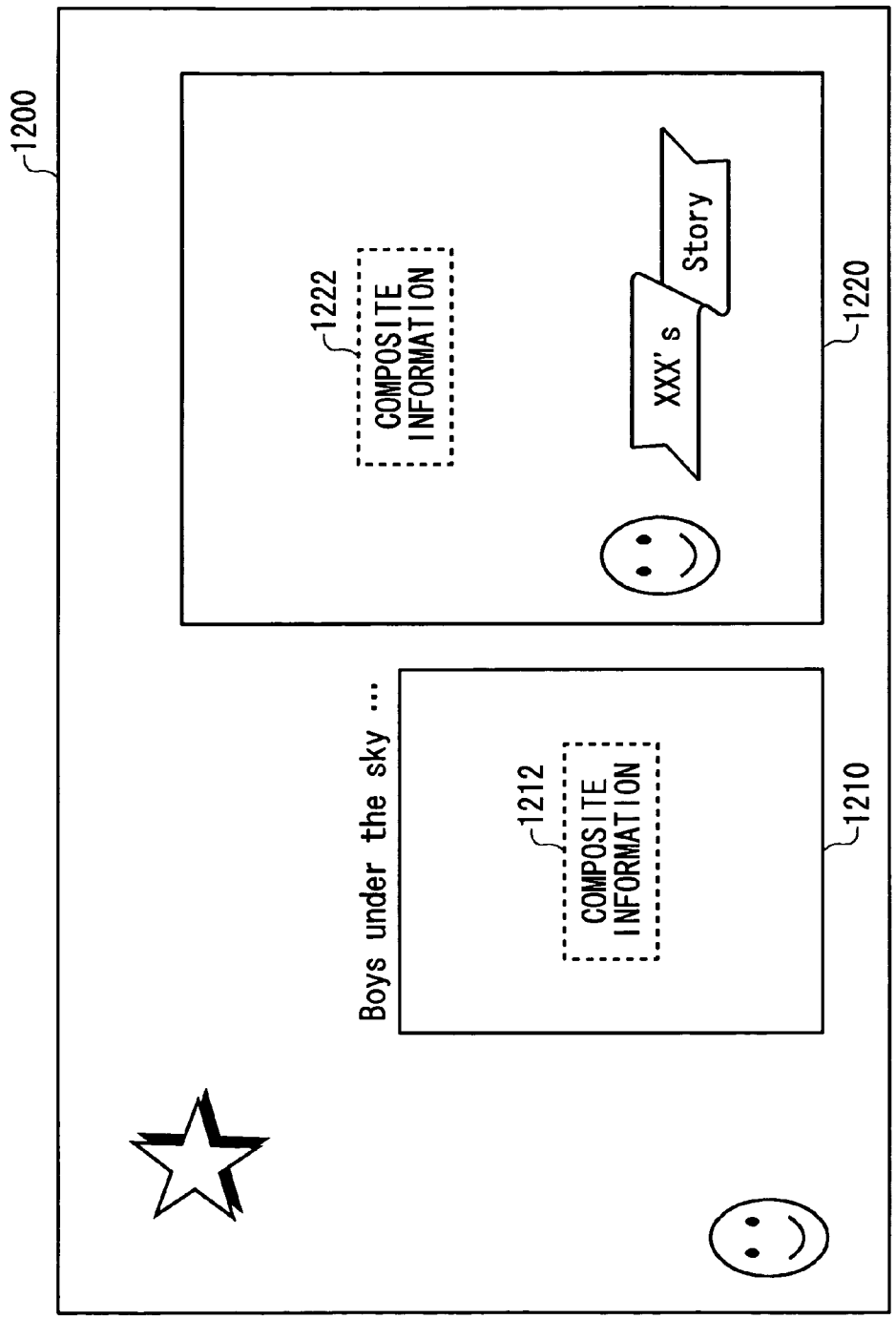
FIG. 9 shows a template 1200.

FIG. 9 shows an example of a template 1200 stored in the template storage section 12 according to the present embodiment. The template storage section 12 stores a template for the output area to previously define an image position and composite information of the image to be laid out at the image position. Here, the image layout frame into which the image should be laid out may be associated with the image position. A plurality image positions may be included in one output area. Additionally, the shape of the image layout frame associated with the image position may be approximately circle and polygon, and the shape of object included in the image.

For example, the template 1200 includes an image layout frame 1210 and an image layout frame 1220. Then, the image layout frame 1210. The composite information 1212 is associated with the image layout frame 1210. The composite information 1222 is associated with the image layout frame 1220. In this case, the representative image extracting unit 105 extracts the composite information 1222 associated with the image layout frame 1220 and extracts the candidate image having information corresponding to the composite information 1222. For example, the information about the variety of the facial expression of the predetermined person is associated with the composite information 1222, the representative image extracting unit 105 extracts the candidate image having the information corresponding to the information about the variety of the facial expression of the person among the plurality of candidate images extracted by the candidate image extracting section 30 as the representative image. Then, the image layout section 140 lays out the representative image extracted by the representative image extracting unit 105 into the image layout frame 1220.

Additionally for example, the facial expression displacement information indicative of the amount of displacement of the facial expression of the predetermined person is associated with the composite information 1222, the representative image extracting unit 105 extracts the candidate image having information corresponding to the information about the amount of displacement of the facial expression of the person among the plurality of candidate images extracted by the candidate image extracting section 30 as the representative image. Specifically, when the facial expression displacement information indicating that the amount of displacement of the predetermined part such as the eyebrow from the position at which the part is in the usual facial expression is more than the predetermined value is associated with the image layout frame 1220 as the composite information 1222, the representative image extracting unit 105 extracts the candidate image including the face of the person of which amount of displacement of the part is more than the amount of displacement indicated by the facial expression information displacement information as the representative image. Then, the image layout section 140 lays out the representative image extracted by the representative image extracting unit 150 into the image layout frame 1220.

Figure 10:
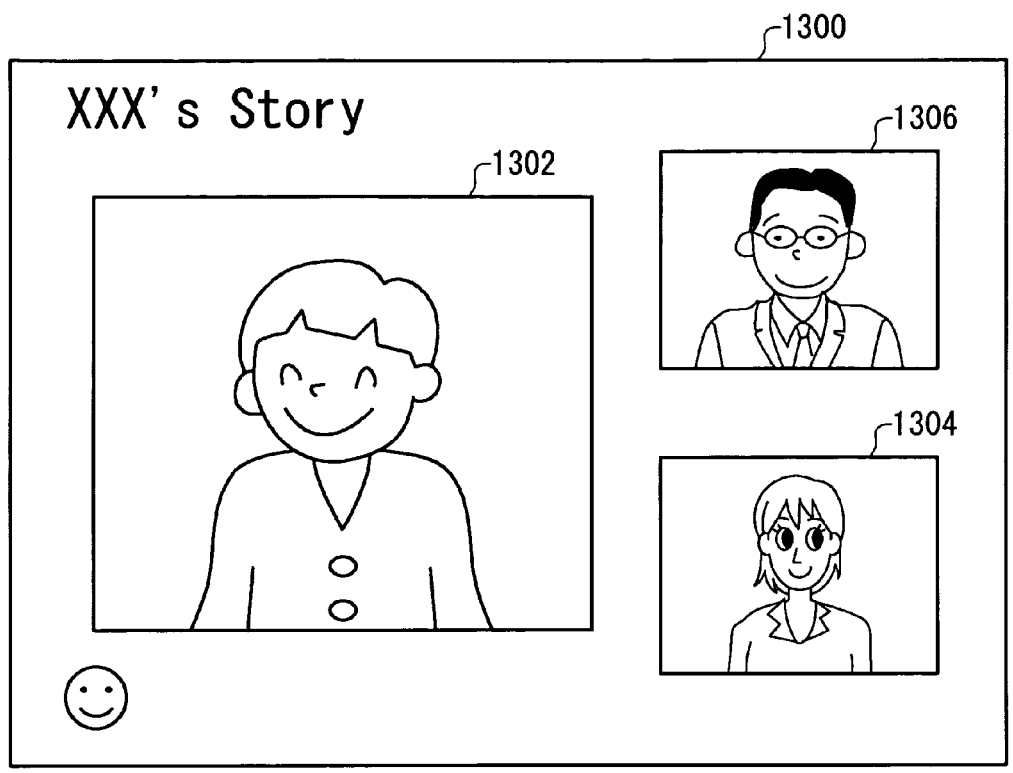
FIG. 10 shows a processing of a facial expression information determining section 125.

FIG. 10 shows an example of processing of the facial expression information determining section 125 according to the present embodiment. For example, variety of facial expression information indicating that the representative image including a person with smiling should be laid out into a first image layout frame 1302 included in a template 1300 is associates with the image layout frame 1302. In this case, the first representative image extracting section 110 receives the variety of facial expression information associated with the image layout frame 1302 from the template storage section 12. Then, the first representative image extracting section 110 extracts the candidate image including the person with the facial expression corresponding to the facial expression indicated by the variety of facial expression information received from the template storage section 12 as the first representative image. After receiving the variety of facial expression information of the first representative image from the first representative image extracting section 110, the facial expression information determining section 125 may associate the predetermined variety of facial expression information with the image layout frame 1304 and the image layout frame 1306 in order to extract the candidate image including the person with the facial expression the same as the facial expression indicated by the received variety of facial expression information as the second representative image. Specifically, the facial expression information determining section 125 may associate the variety of facial expression information indicating that the representative image including the person with smiling is laid out into the image layout frame 1304 and the image layout frame 1306, respectively such that the second representative image including the person with smiling is laid out into the image layout frame 1304 and the image layout frame 1306, respectively.

Figure 11:
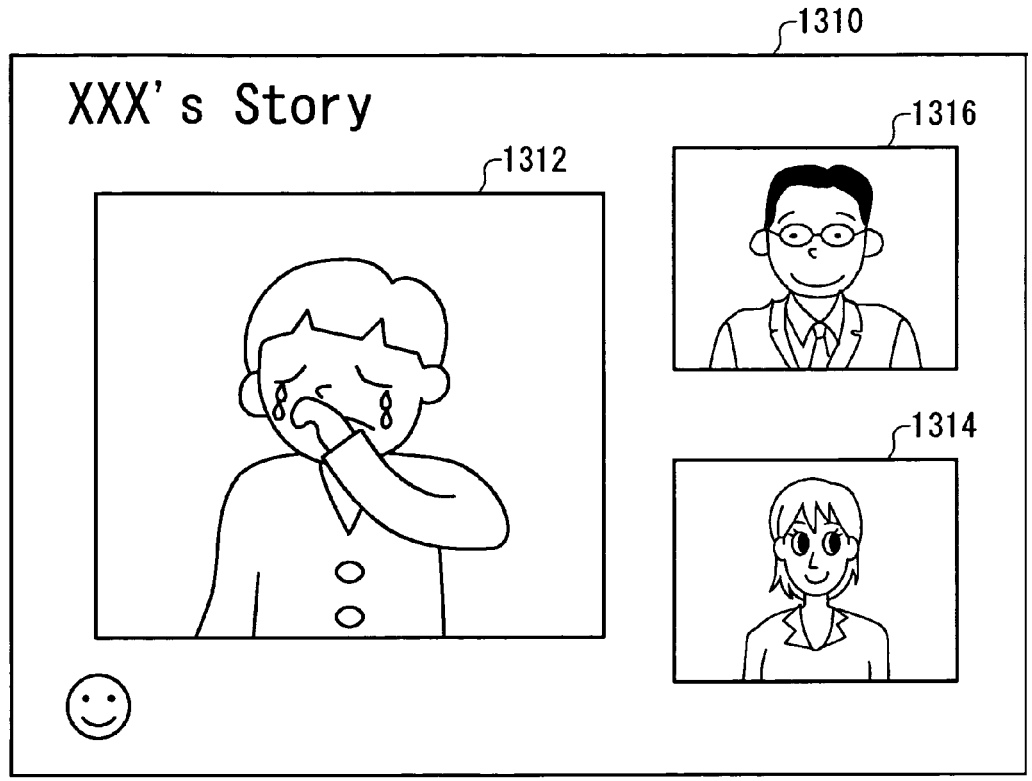
FIG. 11 shows a processing of the facial expression information determining section 125.

FIG. 11 shows an example of processing of the facial expression information determining section 125 according to the present embodiment. For example, variety of facial expression information indicating that the representative image including the person with tearing should be associated with a first image layout frame 1312 included in a template 1310 is associated with the first image layout frame 1312. In this case, the first representative image extracting section 110 receives the variety of facial expression information associated with the image layout frame 1312 from the template storage section 12. Then, the first representative image extracting section 110 extracts the candidate image including the person with the facial expression corresponding to the facial expression indicated by the variety of facial expression information received from the template storage section 12 as the first representative image. After receiving the variety of facial expression information of the first representative image from the first representative image extracting section 110, the first representative image extracting section 125 may associate the predetermined variety of facial expression information with the image layout frame 1314 and the image layout frame 1316 in order to extract the candidate image including the person with the facial expression the same as the facial expression indicated by the received variety of facial expression information as the second representative image. Specifically, the facial expression information determining section 125 may associate the variety of facial expression information indicating that the representative image including the person with smiling with the image layout frame 1314 and the image layout frame 1316, respectively such that the second representative image including the person with smiling is laid out into the image layout frame 1314 and the image layout frame 1316.

Figure 12:
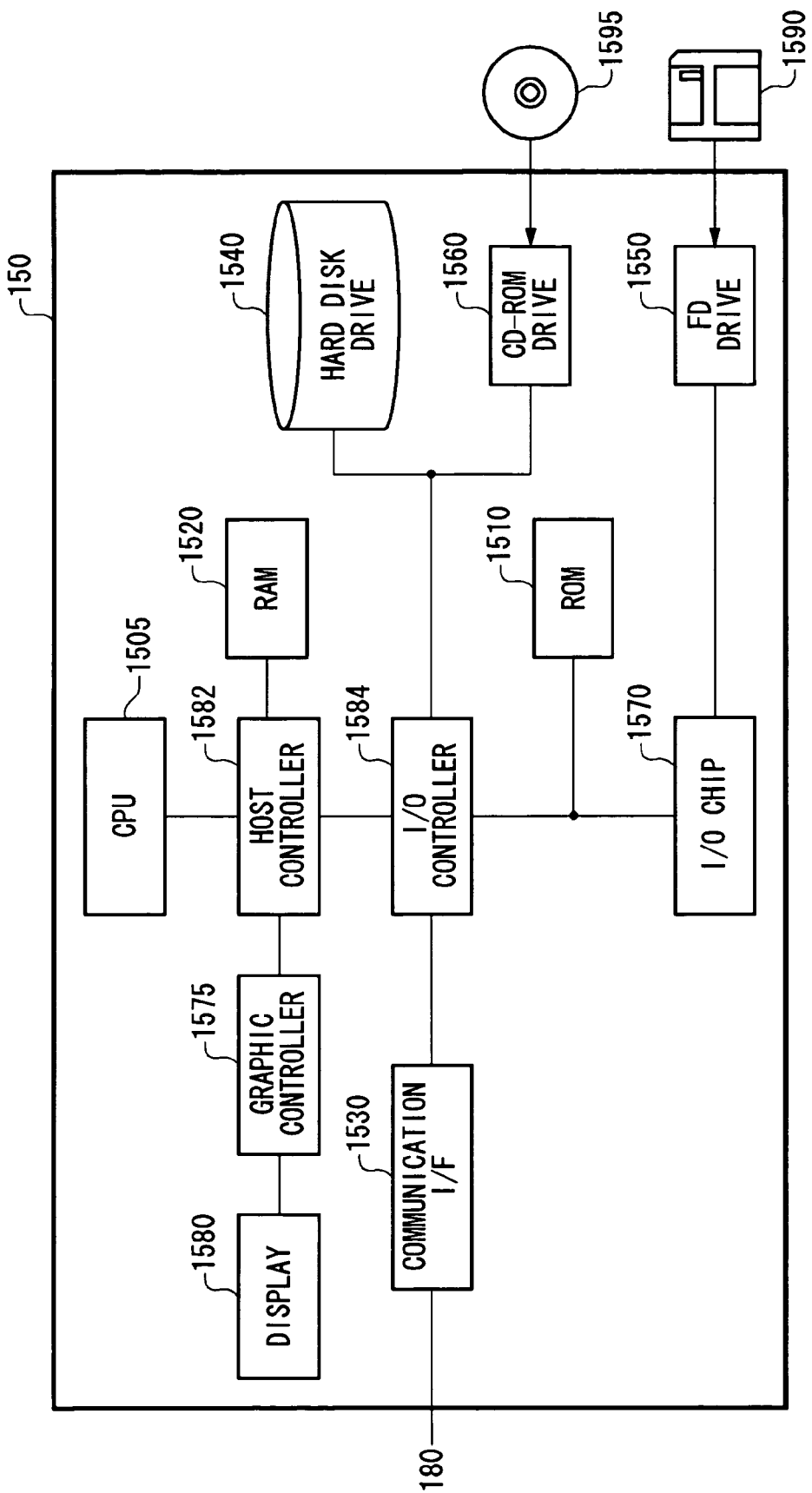
FIG. 12 is a block diagram showing the hardware configuration of the image extracting apparatus 150.

FIG. 12 shows an example of the hardware configuration of the image extracting apparatus 150 according to the present embodiment. The image extracting apparatus 150 according to the present embodiment includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame shape buffer provided in the RAM 1520 by the CPU 1505 and displays the same on the display 1580. Alternatively, the graphic controller 1575 may include therein a frame shape buffer for storing image data generated by the CPU 1505.

The input/output controller 1584 connects the host controller 1582 to the communication interface 1530, the hard disk drive 1540, and the CD-ROM drive 1560 which are relatively high-speed input/output units. The communication interface communicates with the other units through the network 180. The hard disk drive 1540 stores the program and data used by the CPU 1505 in the image extracting apparatus 150. The CD-ROM drive 1560 reads the program or data from the CD-ROM 1595 and provides the same to the hard disk drive 1540.

The ROM 1510, and the flexible disk drive 1550 and an input/output chip 1570 which are relatively low-speed input/output units are connected to the input/output controller 1584. The ROM 1510 stores a boot program executed by the image extracting apparatus 150 at activating and a program depending on the hardware of the image extracting apparatus 150. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouth port.

The image extracting program provided to the hard disk drive 1540 through the RAM 1520 is stored in a recording medium, such as the flexible disk 1590, the CD-ROM 1595, or an IC card and provided by the user. The image extracting program is read from the recording medium, installed in the hard disk drive 1540 in the image extracting apparatus 150 through the RAM 1520 and executed by the CPU 1505. The image extracting program installed in the image extracting apparatus 150 and executed therein operates the image extracting apparatus 150 to function as the image storage section 10, the facial image storage section 20, the candidate image extracting section 30, the facial image extracting section 40, the part image storage section 50, the part image extracting section 60, the average part shape calculating section 70, the average facial information generating section 80, the average facial information storage section 90, the facial image comparison section 100, the first representative image extracting section 110, the facial expression change calculating section 120, the representative image storage section 130, the template storage section 12, the representative image extracting unit 105, the facial expression information determining section 125, the image layout section 140, the image output section 145, the first representative image extracting section 110 and the second representative image extracting section 112 which are described with reference to FIG. 1-11.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

As evidenced by the above description, the present invention can achieve the image extracting apparatus, the image extracting method and the image extracting program for automatically extracting a candidate image including the image of the person with expressive face as a representative image.

What is claimed is:

1. An image extracting apparatus for extracting a candidate image to be outputted as a representative image from a plurality of candidate images, comprising:
a candidate image extracting section for extracting at least one of candidate images including a predetermined facial image from the plurality of candidate images;
a first representative image extracting section for extracting the candidate image including the facial image of a predetermined person having a substantially different facial expression than a prepared facial image which includes a usual facial expression of the predetermined person among at least one of candidate images extracted by the candidate image extracting section;

an average facial information storage section for storing average facial information indicative of the facial image of the predetermined person in association with the predetermined person; and a facial image comparison section for comparing the facial image included in the candidate image extracted by the candidate image extracting section, wherein the first representative image extracting section extracts the candidate image including the facial image having a substantially different facial expression than the facial image indicated by the average facial information stored in the average facial information storage section among the candidate images extracted by the candidate image extracting section based on the comparison result by the facial image comparison section.

2. The image extracting apparatus according to claim 1 further comprising:

a facial image extracting section for extracting the facial image of the predetermined person from each of the plurality of candidate images extracted by the candidate image extracting section, respectively; and an average facial information generating section for generating the average facial information on the predetermined person based on the plurality of facial images extracted by the facial image extracting section, wherein the average facial information storage section stores the average facial information generated by the average facial information generating section in association with the predetermined person.

3. The image extracting apparatus according to claim 1, wherein the candidate image is a moving image component included in a moving image, the candidate image extracting section extracts the moving image component including a predetermined person from the moving image, the first representative image extracting section extracts the moving image component including the facial image of the predetermined person having a substantially different facial expression than the prepared facial image of the predetermined person among the plurality of moving image components extracted by the candidate image extracting section.

4. The image extracting apparatus according to claim 3 further comprising:

an average facial information storage section for storing the average facial information indicative of the facial image of the predetermined person in association with the predetermined person; and a facial image comparison section for comparing each of the facial images included in the plurality of moving image components extracted by the candidate image extracting section with the facial image indicated by the average facial information stored in the average facial information storage section, wherein the first representative image extracting section extracts the moving image component including the facial image having a substantially different facial expression than the facial image indicated by the average facial information stored in the average facial information storage section as a first representative image.

5. The image extracting apparatus according to claim 4 further comprising:

a facial image extracting section for extracting the facial image of the predetermined person from each of the plurality of moving image components extracted by the candidate image extracting section; and an average facial information generating section for generating the average facial information on the predetermined person based on the plurality of facial images extracted by the facial image extracting section, wherein the average facial information storage section stores the average facial information generated by the average facial information generating section in association with the predetermined person.

6. The image extracting apparatus according to claim 5 further comprising:

a part image extracting section for extracting a plurality of part images from each of the plurality of facial images extracted by the facial image extracting section; and an average part shape calculating section for calculating the average shape for each part based on the plurality of part images extracted by the part image extracting section, wherein the average facial information generating section generates the average facial information on the predetermined person based on the average shape for each part calculated by the average part shape calculating section.

7. The image extracting apparatus according to claim 3 further comprising a facial expression change calculating section for calculating the change of the facial image of the predetermined person in the plurality of moving image components extracted by the candidate image extracting section, wherein the first representative image extracting section extracts a moving image component when the facial image of the predetermined person starts changing or a moving image component when the facial image of the predetermined person stops changing as the first representative image based on the change of the facial image of the predetermined person calculated by the facial expression change calculating section.

8. The image extracting apparatus according to claim 1 further comprising a template storage section for storing a template for an output area to previously define an image position and personal facial expression information indicative of the facial expression of the person included in the representative image to be laid out at the image position, wherein the first representative image extracting section extracts the candidate image in which the facial expression of the person indicated by the personal facial expression information in association with the image position included in the template stored in the template storage section and the facial expression of the person included in the candidate image extracted by the candidate image extracting section are corresponded as the first representative image.

9. The image extracting apparatus according to claim 8, wherein the template storage section stores the template for the output area to previously define the image position and the facial expression displacement information indicative of the amount of displacement of the facial expression of the person included in the first representative image to be laid out at the image position, the first representative image extracting section extracts the candidate image in which the amount of displacement of the facial expression of the person indicated by the facial expression displacement information associated with the image position included in the template stored in the template storage section and the amount of displacement of the facial expression of the person included in the candidate image extracted by the candidate image extracting section are corresponded as the first representative image.

10. The image extracting apparatus according to claim 8, wherein
the template storage section stores the template for the output area to previously define the image position and variety of facial expression information indicative of the variety of the facial expression of the person included in the first representative image to be laid out at the image position, and
the first representative image extracting section extracts the candidate image in which the variety of the facial expression of the person indicated by the variety of facial expression information associated with the image position included in the template stored in the template storage section and the variety of the facial expression of the person included in the candidate image extracted by the candidate image extracting section are corresponded as the first representative image.

11. The image extracting apparatus according to claim 1 further comprising:
a template storage section for storing a template for an output area to previously define a first representative image position at which the first representative image should be laid out and a second representative image position at which a second representative image should be laid out;
a facial expression information determining section for determining personal facial expression information included in the second representative image to be laid out at the second representative image position according to the personal facial expression information indicative of the facial expression of the person included in the first representative image extracted by the first representative image extracting section; and
a second representative image extracting section for extracting the second representative image including the person with the facial expression indicated by the personal facial expression information determined by the facial expression information determining section from the candidate images extracted by the candidate image extracting section.

12. The image extracting apparatus according to claim 1, wherein
the usual facial expression is a face without expression.

13. An image extracting method for extracting a candidate image to be outputted as a representative image from a plurality of candidate images, comprising steps performed by an image extracting apparatus including a CPU, said steps including:

a first extracting step of extracting at least one of candidate images including a predetermined facial image from the plurality of candidate images;
a second extracting step of extracting the candidate image including the facial image of the predetermined person having a substantially different facial expression than a prepared facial image which includes a usual facial expression of the predetermined person among at least one of candidate images extracted in the candidate image extracting stem
storing average facial information indicative of the facial image of the predetermined person in association with the predetermined person; and
a comparing step of comparing the facial image included in the candidate image extracted by the candidate image extracting section, wherein
the second extracting step includes extracting the candidate image including the facial image having a substantially different facial expression than the facial image indicated by the average facial information stored in the average facial information storage section among the candidate images extracted in the first extracting step based on the comparison result of the comparing step.

14. A tangible computer readable recording medium encoded with a computer executable image extracting program for extracting a candidate image to be outputted as a representative image from a plurality of candidate images, the computer executable image extracting program when executed causes an image extracting apparatus to implement:
a candidate image extracting section for extracting at least one of candidate images including a predetermined facial image from the plurality of candidate images;
a first representative image extracting section for extracting the candidate image including the facial image of a predetermined person having a substantially different facial expression than a prepared facial image which includes a usual facial expression of the predetermined person among at least one of candidate images extracted by the candidate image extracting section;
an average facial information storage section for storing average facial information indicative of the facial image of the predetermined person in association with the predetermined person; and
a facial image comparison section for comparing the facial image included in the candidate image extracted by the candidate image extracting section, wherein
the first representative image extracting section extracts the candidate image including the facial image having a substantially different facial expression than the facial image indicated by the average facial information stored in the average facial information storage section among the candidate images extracted by the candidate image extracting section based on the comparison result by the facial image comparison section.

* * * * *